(12) United States Patent
Jackson et al.

(10) Patent No.: US 9,949,430 B2
(45) Date of Patent: Apr. 24, 2018

(54) SELF-PROPELLED POWER EQUIPMENT SPEED CONTROL

(71) Applicant: GXi Holdings, LLC, Clayton, NC (US)

(72) Inventors: Gordon W. Jackson, Clayton, NC (US); William R. Best, Dudley, NC (US)

(73) Assignee: GXi Holdings, LLC, Clayton, NC (US)

( * ) Notice: Subject to any disclaimer, the term of this patent is extended or adjusted under 35 U.S.C. 154(b) by 169 days.

(21) Appl. No.: 14/964,028

(22) Filed: Dec. 9, 2015

(65) Prior Publication Data

US 2017/0164552 A1 Jun. 15, 2017

(51) Int. Cl.
*B62D 51/04* (2006.01)
*A01D 34/00* (2006.01)
*A01D 69/00* (2006.01)
*A01D 101/00* (2006.01)

(52) U.S. Cl.
CPC .......... *A01D 34/006* (2013.01); *A01D 69/00* (2013.01); *A01D 2101/00* (2013.01)

(58) Field of Classification Search
CPC ... A01D 34/006; A01D 69/00; A01D 2101/00
See application file for complete search history.

(56) References Cited

U.S. PATENT DOCUMENTS

| | | | |
|---|---|---|---|
| 4,835,949 A | 6/1989 | Sewyerle | |
| 4,907,401 A * | 3/1990 | Nemoto | A01D 34/6806 56/11.3 |
| 5,934,052 A | 8/1999 | Kamm | |
| 6,082,083 A | 7/2000 | Stalpes et al. | |
| 6,475,109 B2 * | 11/2002 | Blanchard | A01D 34/69 474/101 |
| 6,755,759 B2 * | 6/2004 | Blanchard | F16H 9/18 474/19 |
| 6,945,133 B2 * | 9/2005 | Rush | A01D 34/6806 16/437 |
| 8,226,508 B2 * | 7/2012 | Osborne | A01D 34/6806 474/101 |
| 8,851,256 B2 * | 10/2014 | Blanchard | A01D 34/6812 192/48.5 |
| 9,456,546 B2 * | 10/2016 | Blanchard | A01D 34/69 |

FOREIGN PATENT DOCUMENTS

| | | |
|---|---|---|
| CN | 101697680 A | 4/2010 |
| CN | 102197744 A | 9/2011 |

OTHER PUBLICATIONS

"Toro 22in Recycler Lawn Mower Parts Catalog—Form No. 3381-208 Rev. B", Form No. 3381-208 Rev. B, p. 18.

* cited by examiner

*Primary Examiner* — Anne Marie M Boehler
*Assistant Examiner* — Marlon A Arce
(74) *Attorney, Agent, or Firm* — James G. Passé; Passé Intellectual Property, LLC

(57) ABSTRACT

The present invention includes a control system for manually varying the speed of a walk behind belt-driven self-propelled lawn mower. The self-propelled lawn mower transmission is equipped with a lever for tilting the transmission for tightening or loosening the belt, and this increases or decreases the lawn mower speed.

4 Claims, 4 Drawing Sheets

SELF-PROPELLED POWER EQUIPMENT SPEED CONTROL

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a walk behind powered drive piece of outdoor equipment. More specifically, the present invention relates to a control system on a walk behind lawn mower wherein there is a pivoting handlebar that controls the speed of the lawn mower.

Description of Related Art

The walk behind rotary lawn mower is well known and consists of a wheeled housing and a generally U-shaped handle extending upwardly and rearwardly from the housing for pushing, guiding, and steering the lawn mower during use. Where the lawn mower is self-propelled the need to push the mower is eliminated and a variable speed can be utilized to match the speed of the mower to the walking pace of the individual user of the lawn mower.

Several approaches are known to control the speed of a walk behind self-propelled lawn mower. One method relies on pivoting a portion of the handle to control speed, doing away with the separate pivotal control bail. The lawn mower comprises multiple drive and driven plates which are separated when the clutch is disengaged, biasing the plates to separated positions wherein tilting the handle effects rotation of the drive wheel by applying variable pressure, so as to variably engage the clutch. This device is relatively difficult to use and has a large number of parts, leading to difficulty in keeping the device adjusted and in repair.

Another approach to variable speed walk behind lawn mowers involves a sliding handle grip wherein the handle is fixed to the mower housing such that it maintains a fixed angle of inclination, wherein the sliding motion pulls on a transmission cable that controls the ground speed. While this system is more recent and simpler in construction, it suffers from even more problems. Stopping the system for reverse action is slow or non-existent, since it can lock up the wheels or not stop fast enough. In addition, since the speed varies with grip, there can be accidents caused due to grip problems, such as not being able to let go fast enough. While walking, you must continuously push downward to operate the variable speed slide mechanism. This downward push makes the action unnatural. The rear wheels are locked upon stopping and, in order to make a 180 degree turn, it is not easy to prevent the wheels from spinning, as pushing down and forward is what lifts the front of the deck as well as engages the transmission.

While both of these types of systems are still in use to control ground speed, both are still somewhat unnatural to use in cutting the lawn. The safety issues around their use, their difficulty in smoothly controlling ground speed, as well as the jerky motion created while using these devices, has led many lawn mower users to shy away from the self-powered mowers with variable speed controlled by the user. Finding a better way to control ground speed in a continuous variable manner is still sought after by the industry.

BRIEF SUMMARY OF THE INVENTION

The present invention relates to the discovery that the problems and dangers of the above prior art lawn mower speed control systems can be overcome with a lever system on the wheel transmission. This lever system is controlled by pushing or pulling on the lawn mower handle, which connects to and presses on the lever to tilt the transmission, creating tension or slack in the fan belt, and speeding up or slowing the lawnmower ground speed, respectively. By utilizing rigid handle arms to push or pull on the lever, the speed is easily controlled, does not have complicated parts or easy to break parts, reverses easily, and is easy to use. In addition, it is easier and less expensive to manufacture, while providing superior performance, since it uses less parts.

Accordingly, in one embodiment of the invention there is a self-propelled, walk behind, engine powered lawn mower having a user controlled variable speed adjustment system, the adjustment system comprising:

a) a transmission for delivering rotary energy to two opposing axles which drive corresponding opposing lawn mower wheels positioned behind the engine, wherein the transmission is powered by a drive belt operationally connected between a flywheel on the transmission and a flywheel on the engine, and wherein the transmission can be rotated around the two opposing axles from a position closer to the engine flywheel to a position farther from the engine flywheel, such that the drive belt will correspondingly go from a slack condition to a taut position;

b) a lever mounted on the transmission flywheel and extending toward and having a terminal end in-between the transmission flywheel and the engine flywheel; and c) a U-shaped push handle having two rigid arms, having a proximal end for holding by the user and the distal end of the arms attached to a rear portion of the lawn mower wherein the distal end of one of the arms is attached to the lever terminal end, such that pushing or pulling on the handle will cause the lever to rotate the transmission.

DETAILED DESCRIPTION OF THE INVENTION

Figure 1:
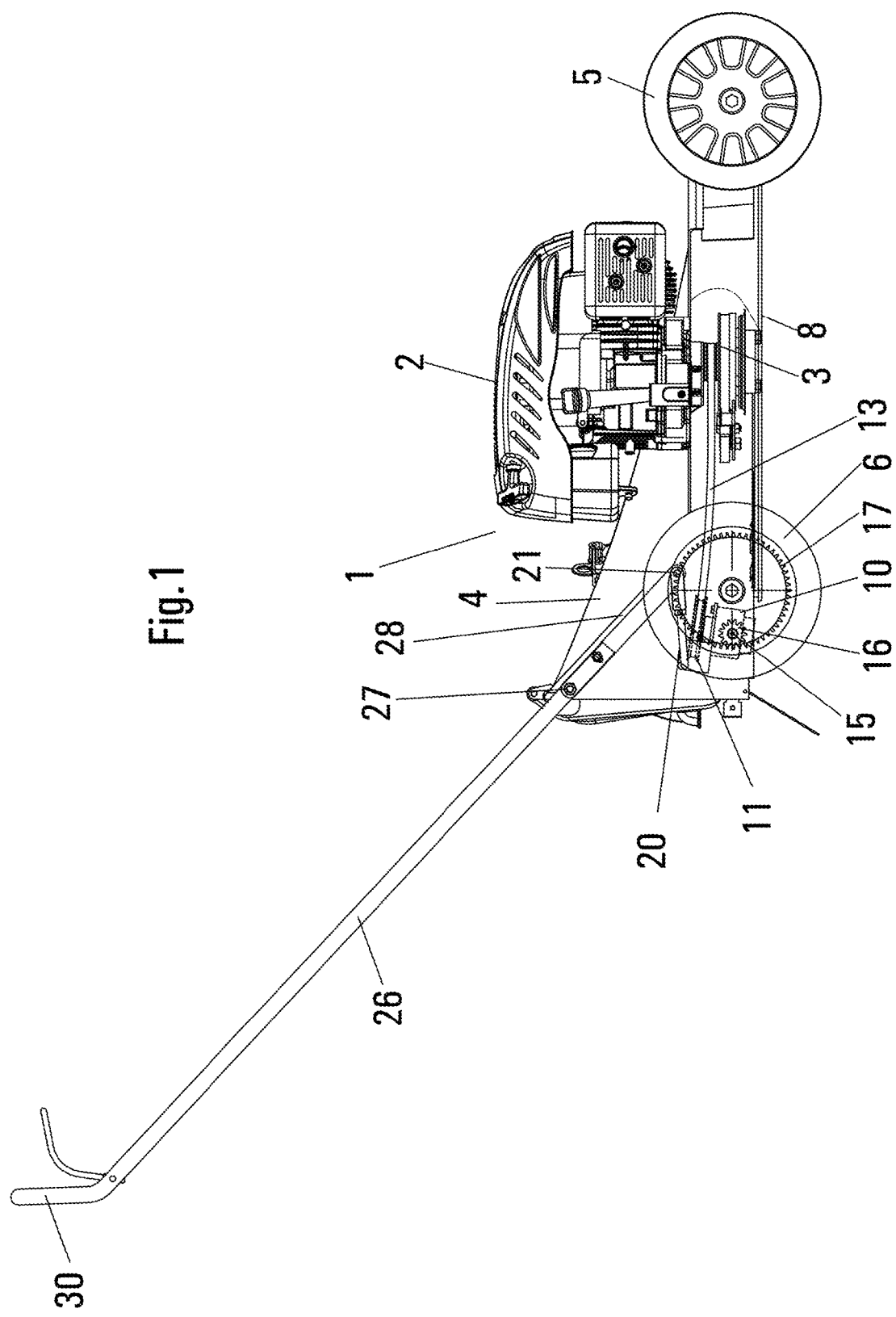
FIG. 1 is a side view of the lawn mower showing the transmission in neutral position.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein a "self-propelled walk behind engine powered lawn mower" is well known. It consists of an engine, a housing, cutting rotatable blades in a chamber in the housing, a U-shaped handle extending upwardly and rearwardly (proximal to a user) to guide the lawn mower, and the engine by the rear wheels. In this embodiment, the lawn mower is self-propelled such that the engine not only powers the spinning of the blades, but the engine is also connected to a transmission for converting the rotating power of the engine to rotate axles powering the rear wheels of the lawnmower.

As used herein a "user controlled variable speed adjustment system" refers to a device, or collection of devices, designed to vary the ground speed of the lawn mower without changing the speed of the spinning blades. While speeding up and slowing down the motor would change the ground speed, it would have the undesirable effect of changing the rotating speed of the cutting blades and thus their effectiveness.

As used herein a "transmission" refers to a device for taking the rotary energy of a spinning flywheel from the engine, and transferring that energy by a fan belt to a transmission as shown in the figures. The transmission then, through a series of gears (well known in the art), transfers that rotary energy to rotary energy for two axles connected to the rear wheels of the lawn mower. Transmissions for lawn mowers that are self-propelled are well known in the art. In one embodiment, the pulley is on the top of the transmission and is connected to a pulley on the bottom of the engine via a v-belt. The transmission is mounted and constructed such that the transmission can rotate around the two opposing axles, from a position closer to the engine (forward, toward the front wheels) to a position upright or away from the front of the engine. This is done in a manner shown in the figures such that rotating the transmission forward puts slack in the fan belt and slows or stops the forward movement of the lawn mower, or rotating the transmission backward tightens the fan belt to a point where the maximum speed is obtained. As can be seen in the figures, in one embodiment the axles are offset from the center of the wheels and, rather than the axles being attached to the center of the wheels and turning them, the axles have a gear tooth drive which mates with gear teeth out from the center of the wheel to drive the rear wheels.

As used herein the term "lever" is a rigid arm or the like, positioned on the transmission to cause the rotatable transmission to rotate forwards or backwards. In one embodiment, the lever sits on the top of the transmission. Where the flywheel is on top of the transmission, the lever is mounted on the top of the flywheel. The lever can be a single piece, or a number of pieces connected together. In one embodiment, the lever is three pieces comprising a mounting bracket mounted directly on the transmission flywheel, a rod connected to the mounting bracket at one end of the rod, and a connecting device for connecting the other end of the rod to the arms of the handle as explained later. The lever is positioned generally in an embodiment in the line of travel of the lawn mower, starting at the transmission at one end, and terminating in-between the transmission flywheel and the engine flywheel at the other end. In one embodiment, the lever is generally horizontal, and in one embodiment, horizontal is the full speed position. Putting pressure on the terminating end of the lever up or down will then cause the transmission to rotate forward or back as shown in the figures.

As used herein, the phrase "U-shaped push handle" refers to a standard shaped handle for a lawn mower, with an end distal to the engine, designed for holding onto and guiding the lawn mower, and two arms at the proximal end (nearest the lawn mower frame or housing) designed for attaching the arms to the lawn mower by the frame, housing, engine, lever, or the like. In the present invention, the proximal end of one of the arms is attached to the terminal end of the lever, such that pushing or pulling on the handle will push or pull the lever, thus tilting forward or back the transmission, and slowing or speeding up the lawn mower. The handle arms will be rigid, and not have any points that can pivot, and while in one embodiment the handle is one piece, however the handle can be as many pieces as desired as long as it is rigid. Pieces can be bolted together, or any method used in the art of constructing lawnmowers. In one embodiment, the arm contacting the terminal end of the lever is an extension piece added onto the arm, such that the attached arm is longer than the non-attached arm. The handle end is then attached to the terminal end of the lever and, in one embodiment, the attachment is accomplished by using a connector between the two ends.

In many prior art lawn mowers the transmission is positioned midway between the two rear wheels with connecting axles. In one embodiment, shown in the drawings, the transmission is positioned offset to the center line of the lawn mower such that one axle is longer than the other, and the transmission is positioned to meet one of the ends of the arms of the handle.

Now referring to the drawings. FIG. 1 is a side cutout view of a lawnmower with the variable speed system of the present invention. Lawn mower 1, consisting of an engine 2 which drives engine flywheel 3 and lawn mower blades 8, which are positioned in housing 4 in-between front wheel 5 and rear wheel 6. Transmission 10 having flywheel 11 has fan belt 13 connected between flywheel 11 and engine flywheel 3. In this view, the transmission 10 is tilted toward the front wheels 5 of the lawn mower 1 causing slack in the fan belt 13 which is so great there is no movement of the lawn mower 1, i.e. this is a neutral position. As can be seen, the axle 15 has a toothed end 16 which matches teeth in the wheel 17 which when rotated drives the wheels forward when the axles are rotated forward by transmission 10.

In FIG. 1 the transmission is tilted via lever 20 (shown in more detail in FIG. 4) having one end attached to the flywheel 11 and the terminal end 21 attached to of the proximal end of handle 26. In this view, handle 26 has bolted 27 an attachment of extension 28 to reach terminal end 21 of lever 20. As can be seen, pushing or pulling on handle 26 at distal end 30 will lift or push on lever 20 causing tilt of the transmission 10.

Figure 2:
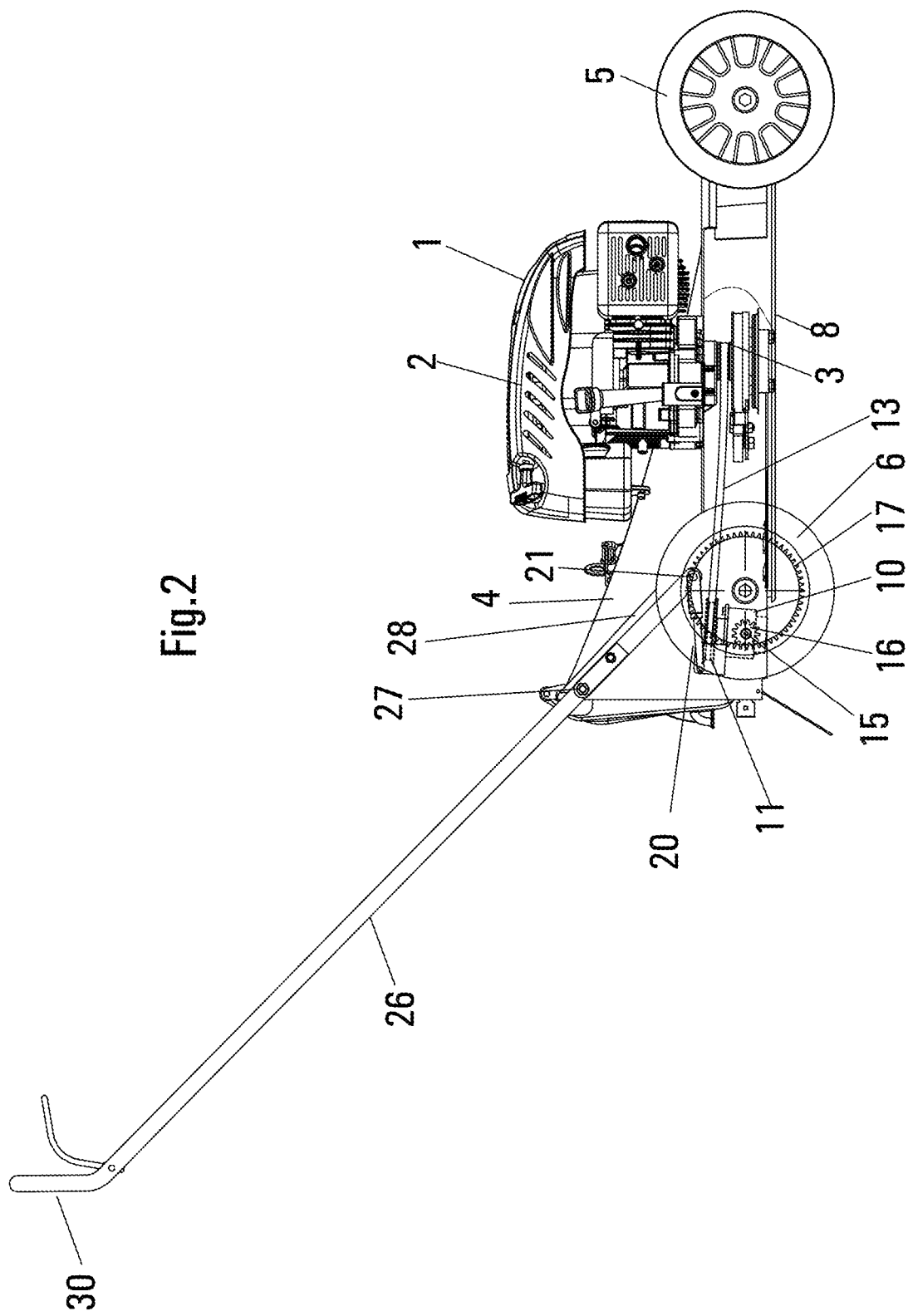
FIG. 2 is a side view of the lawn mower showing the transmission in full speed position.
Figure 3:
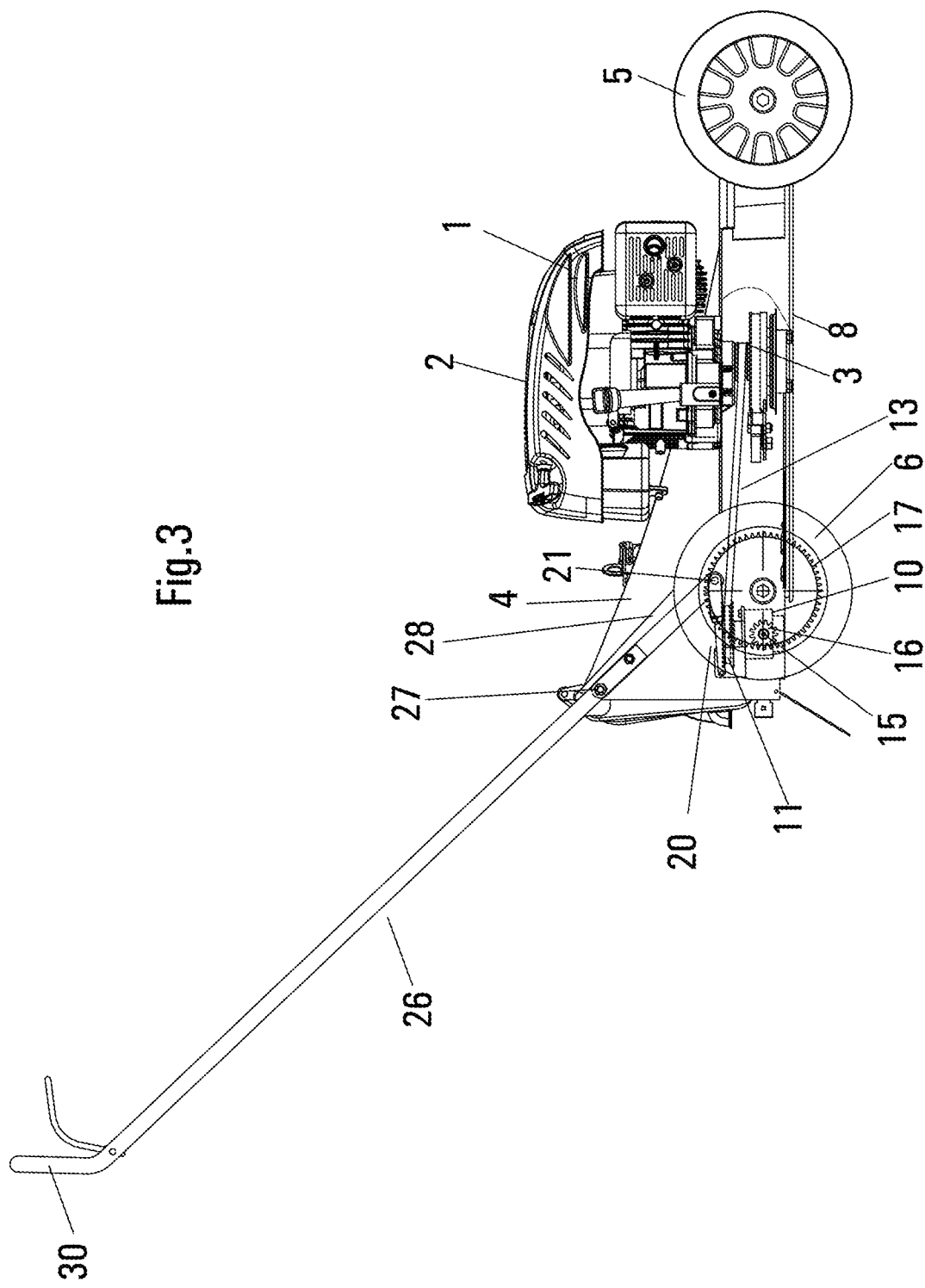
FIG. 3 is a side view of the lawn mower showing the transmission in a middle speed position.

FIG. 2 shows the same side view with the lever 20 lifted up as high as it will go, leveling off the flywheel 11 to give a taught v in fan belt 13 and give the highest speed possible, matching the speed of the engine flywheel 3. FIG. 3 shows the lever 20 in a midway position such that the lawn mower fan belt 13 is not fully tight nor fully loose and thus a middle speed is created.

Figure 4:
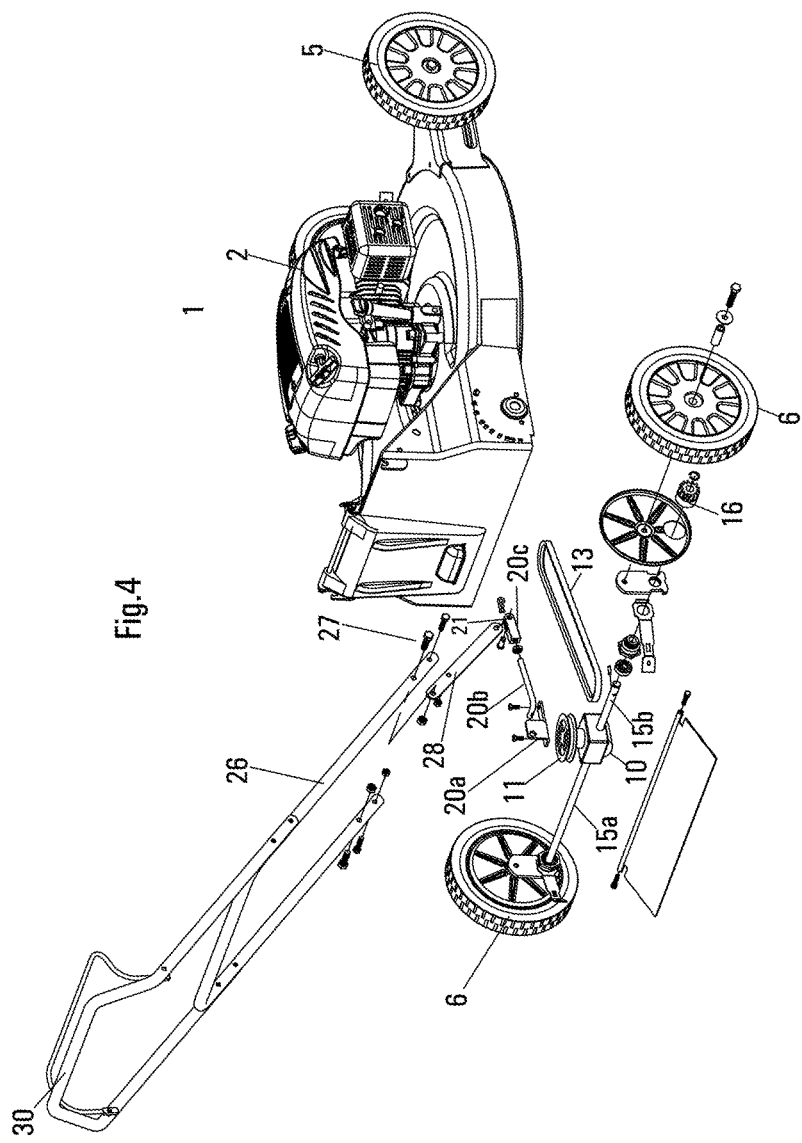
FIG. 4 is a perspective view of the lawn mower with an exploded view of the variable speed system of the invention.

FIG. 4 is a perspective view of lawn mower 1 with the drive system of the invention in exploded view. In this view the lever 20 is broken down into three pieces, the transmission mounting bracket 20a, a rod lever 20b and a connector 20c for connecting arm extension 28 to the terminal end 21 of lever 20. The axles 15 are shown in this view and, as can be seen, the transmission 10 is offset from the center with axle 15a being longer than axle 15b to position the transmission 10 offset from the center line of the lawn mower 1 such that the transmission 10 and lever 20 can mate with arm extension 28. In this embodiment, the mounting bracket 20a is bolted to the flywheel 11 and the connector 20c uses a bolt and cotter pin attachment to attach to arm extension 28. Any connecting means are within the skill of the art in view of this disclosure and various modifications are possible once the invention is understood.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A self-propelled, walk behind engine powered lawn mower having a user controlled variable speed adjustment system, the adjustment system comprising:
   a) a transmission for delivering rotary energy to two opposing axles which drive corresponding opposing lawn mower wheels positioned behind the engine, wherein the transmission is powered by a drive belt operationally connected between a flywheel on the transmission and a flywheel on the engine and wherein the transmission can be rotated around the two opposing axles from a position closer to the engine flywheel to a position farther from the engine flywheel such that the drive belt will correspondingly go from a slack condition to a taut position;
   b) a mounting bracket mounted directly on the transmission flywheel, a lever arm rod connected to the bracket and connector for connecting the lever arm rod to a handle arm mounted on the top of the transmission flywheel and extending toward and having a terminal end in-between the transmission flywheel and the engine flywheel;
   c) a U-shaped push handle having two rigid arms having a proximal end for holding by the user and the distal end of the arms attached to a rear portion of the lawn mower wherein the distal end of one of the arms is attached to the lever terminal end such that pushing or pulling on the handle will cause the lever to rotate the transmission.

2. The lawnmower according to claim 1 wherein the transmission is positioned offset from a midpoint between the two wheels, in line with one of the handle arms and the two opposing axles are of different lengths to accommodate the transmission offset.

3. The lawn mower according to claim 1 wherein the handle arm that is attached to the lever has an extension attached to that arm.

4. The lawn mower according to claim 1 wherein the transmission flywheel is mounted on a top of the transmission.

* * * * *